(12) United States Patent
Juhler

(10) Patent No.: US 7,251,340 B2
(45) Date of Patent: Jul. 31, 2007

(54) SUSPENSION FOR MICROPHONES

(75) Inventor: Jan Juhler, Dronningens Tvaergade 12, 2., DK-1302 Copenhagen K (DK)

(73) Assignee: Jan Juhler, Copenhagen (DK)

( * ) Notice: Subject to any disclaimer, the term of this patent is extended or adjusted under 35 U.S.C. 154(b) by 496 days.

(21) Appl. No.: 10/301,593

(22) Filed: Nov. 22, 2002

(65) Prior Publication Data

US 2003/0117506 A1    Jun. 26, 2003

Related U.S. Application Data

(60) Provisional application No. 60/331,991, filed on Nov. 23, 2001.

(30) Foreign Application Priority Data

Nov. 23, 2001   (DK)   ............................... 2001 01748

(51) Int. Cl.
*H04R 9/08*    (2006.01)

(52) U.S. Cl. ...................... 381/361; 381/359; 381/362; 381/366

(58) Field of Classification Search ................ 381/355, 381/359, 361–368, 375; 181/171, 172; 379/430
See application file for complete search history.

(56) References Cited

U.S. PATENT DOCUMENTS 4,039,765 A  *  8/1977  Tichy et al. ................. 379/430

| | | |
|---|---|---|
| 4,396,807 A | 8/1983 | Brewer |
| 4,458,266 A | 7/1984 | Mahoney |
| 4,600,077 A | 7/1986 | Drever |
| 4,966,252 A | 10/1990 | Drever |
| 6,459,802 B1 * | 10/2002 | Young ........................ 381/368 |

FOREIGN PATENT DOCUMENTS

| | | | |
|---|---|---|---|
| GB | 792148 | | 3/1958 |
| JP | 59-19498 | | 1/1984 |
| JP | 59019498 A | * | 1/1984 |
| JP | 2000-152360 A | | 5/2000 |
| WO | WO-94/04009 A1 | | 2/1994 |

* cited by examiner

*Primary Examiner*—Sinh Tran
*Assistant Examiner*—Brian Ensey
(74) *Attorney, Agent, or Firm*—Birch, Stewart, Kolasch & Birch, LLP

(57) ABSTRACT

A microphone suspension, particularly for absorbing the vibrations from a boom. The microphone suspension has a base member pivotable mounted to the boom. Bars extend substantially perpendicular to the base member and are adapted to hold an internal microphone holder by first elastic members. An oval ring-shaped member interconnects the bars in the ends opposite to the base member. At least one microphone can be suspended in the internal holder.

11 Claims, 9 Drawing Sheets

Program Processing threads, in detection mode

Display and detection thread

Acquisition thread

SUSPENSION FOR MICROPHONES

Figure 1:
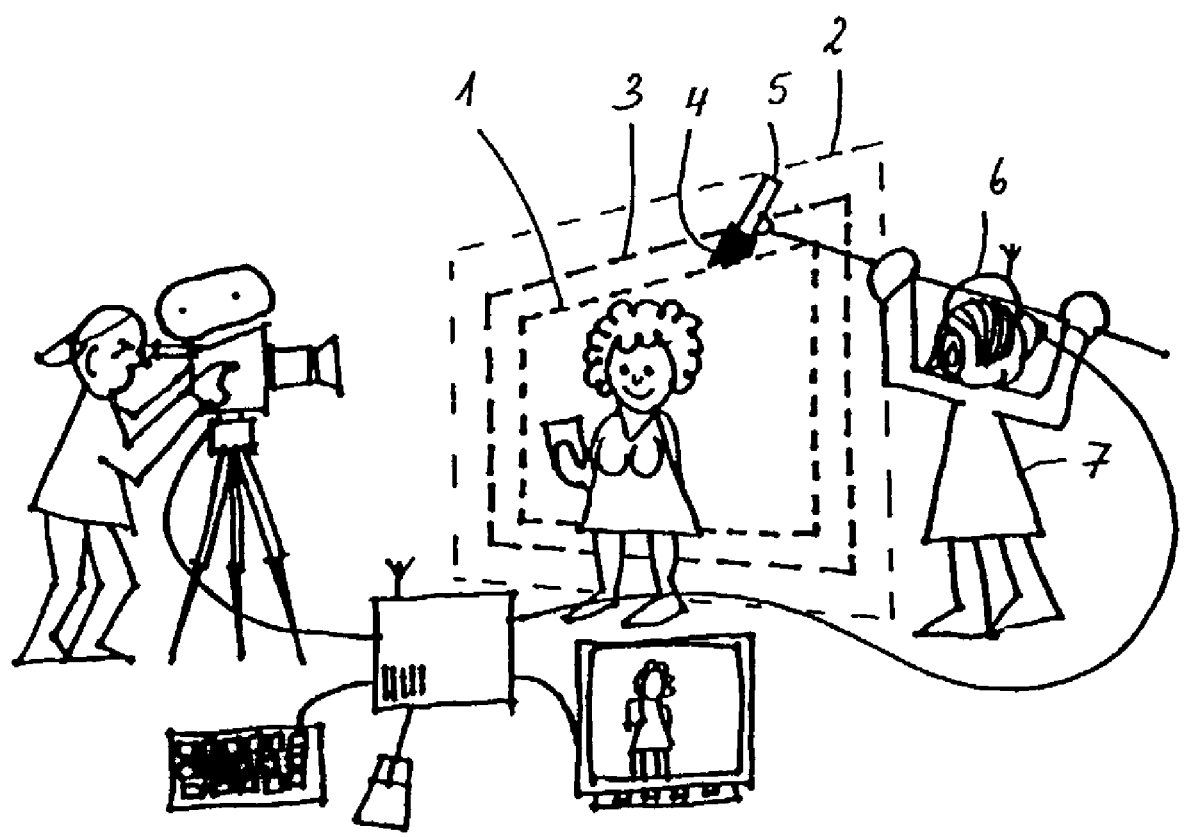

This application claims priority on provisional Application No. 60/331,991 filed on Nov. 23, 2001, the entire contents of which are hereby incorporated by reference.

The invention relates to equipment for shooting of film, and in particular to a system and a method for avoiding objects in a field of vision, to a microphone suspension and to a wind hood for a microphone.

BACKGROUND OF THE INVENTION

Sound equipment for shooting of films often comprises a boom with a microphone mounted in the end, and wherein a boomer (the person holding the boom) holds the boom right above the actors in a specific distance therefrom, so as to obtain as good sound on the film as possible. The microphone may not be dropped into the field of vision and it is very difficult for the boomer to determine when the microphone is close to or is in the field of vision.

Prior art describes systems, wherein an active item (such as a diode) is positioned on the microphone and which, via a control system, communicate a signal to the boomer when the microphone is close to the field of vision.

For obtaining as good sound on the film as possible, there are high requirements to the microphone, e.g. how it is moved and its position. Microphones are often suspended in the end of a boom in a suspension having very weak vibration damping. As it is difficult for the boomer to keep the microphone still during recording, there will always be some vibrations in the microphone, which reduce the sound quality.

Furthermore, the wind effect on the microphone has a big influence on the sound quality on the film, and therefore it is necessary to reduce the wind effect on the microphone as much as possible. The microphone is often surrounded by a foamed membrane, which has a sound wave preventing effect, so that to enter the microphone the sound waves have to pass through a thick membrane. Thus, the sound quality is reduced.

DESCRIPTION OF THE INVENTION

It is an object of the present invention to provide a system for avoiding unwanted objects in a field of vision, so as to make it easier for the boomer to control the movement of the microphone and so as to ensure that the film or a part thereof is not destroyed due to unwanted objects in the field of vision.

It is a further object of the present invention to provide a suspension for a microphone, which absorbs the vibrations from the boom, and wherein a plurality of microphones can be suspended.

It is a further object of the present invention to provide a wind hood for a microphone, wherein the wind effect on the microphone is reduced to a minimum, and which allows for as free passage for the sound waves to the microphone as possible.

According to a first aspect, the present invention relates to a system for avoiding unwanted objects in a field of vision and comprising:
  a field of vision defining a predetermined picture format/size,
  a search field,
  an alarm field,
the field of vision being a proper subset of the alarm field, which is a proper subset of the search field,
  detectable means attached to the unwanted object,
  detecting means for searching the detectable means within at least a part of the search field, and
  signaling means for signaling when the detectable means enters said alarm field.

The alarm field is preferably adjustable and thus making it possible to define the distance between the field of vision and the alarm field. The alarm field may be set such that the signaling means signal when the object is in a predefined distance from the edge of the field of vision. The alarm field may be equal to the search field or equal to the field of vision.

The signal from the signaling means may be louder (audio) or lighting more (visual) the closer the object is to the field of vision, such that e.g. the boomer knows when the object is getting close to the field of vision. The object may only be searched within the alarm field including the field of vision or in the limited area defined as the area within the alarm field but outside the field of vision. The object can also be searched in the entire search field.

An apparatus may provide the field of vision and/or the search field for capturing images, and which may be able to capture still images or moving images. The apparatus for capturing moving images may use rolls of film sensitive to light but may also be a system of light sensitive elements such as diodes, with which the pictures can be stored electronically—either analogue or digital.

For electronically stored pictures the system preferably comprise one camera used to generate the search field. The alarm field is generated by cutting the search field according to the settings of the alarm field. The settings of the alarm field may be set to a predetermined constant but could as so be set to a user defined changeable variables. The field of vision may be generated for the said search field by cutting it according to the chosen picture format, but could also be generated by a second camera generating electronically stored pictures, which may have a different picture quality than the said camera for generating the search field.

For storing the pictures on rolls of film the system may comprise two cameras. One camera for storing the pictures electronically used to generate the search field and one camera for storing the pictures on rolls of film used to generate the field of vision. The alarm field is generated by cutting the search field according to the settings of the alarm field using the above said method.

The above said system for detecting unwanted objects may be implemented into the house of a camera, but could also be implemented in a separate box.

The detectable means are preferably passive means, which does not emit signals for detecting its position. Instead the passive means reflects incoming light, thus the passive means is not powered by electricity. Preferably, the passive means is colored in a specific color making it possible for the system for detecting unwanted objects to detect the said objects by monitoring the said specific color.

The detecting means may comprise storing means for storing a reference color equal to said specified color, and processing means for detecting groups of pixels having at least a predefined number of pixels representing said specified color. Thus, the system search the entire search field or alarm field for groups of pixels representing the specified color, and when it has found a group consisting of a predefined number, it may compare the color with the reference color. Thus, it knows where the detectable means is in the search field and/or alarm field.

When light is directed to an element having one color the color of the object may look different depending on weather one looks at the shiny side or the shadow side of the object. Accordingly in this invention a color may be seen as not only one specific color but also as a shades or nuances of the same color, the shades being slightly different. Thus the storing means may store shades of the same color and/or shades of one color may be searched for in the algorithm/program. I.e. shades of one color e.g. blue (lighter and darker) may be searched for and/or shades of one color e.g. blue (lighter and darker) may be stored in the memory. It may be an object of the present invention to search for a plurality of colors (and their shades). As an example shades of yellow, and shades of green may be searched for if the object comprises both yellow and green.

Preferably, the means for detecting comprises a color histogram indicating the primary background colors in said search field, so as to allow choosing of a distinguishing specified color for the detectable means in relation to said background colors. Thus, there is less chance of detecting an object in the search field not being the unwanted object, but e.g. the trousers of one of the actors.

The system is preferably used in connections, where the object comprises a microphone suspended in a microphone suspension. In that case the detectable means may comprise a wind hood surrounding said microphone and being colored in said specific color. Thus, it is possible for the boomer always to keep the microphone out of the field of vision but as narrow as possible depending on the setting of the alarm field.

In order to be sure that the wind hood is detected regardless of which way it is directed in relation to the light source, the wind hood may be made of a material having a substantially homogenous light reflecting surface and it may be tubular and substantially ring-shaped. The material may comprise a textile of thin woven nylon fibers. In some embodiments the material comprises frotte and/or terry cloth and/or towel cloth and/or velour.

The system may also detect the unwanted object using other means solely or in combination with the above said means using color. These other means may be means for detecting the shape of the unwanted object but may also be means for detecting changes in the color reflected by the unwanted object. This could be done by letting the unwanted object rotate around an axis thus displaying different sites of the object with a given interval. By letting the unwanted object have different color on different sites, the rotation of the unwanted object generates a pattern detectable for the system for detecting the unwanted object. The wind hood may be provided with different colors e.g. in a pattern which may be used to detect the wind hood. Seen form the camera the contour of the wind hood may have sharp edges such that a sharp transition between the wind hood and the surroundings may be provided. The actual shape of the wind hood e.g. seen in a direction parallel to the microphone may be more smooth such that wind turbulence around the wind hood is eliminated.

Preferably, the signaling means comprise means for transmitting the alert to e.g. the boomer. The transmitting means may comprise means for transmitting the signal via wire and/or wireless communication, such as infra red communication or radio frequency. The alert signal may be an audio or visual or a vibration signal.

According to a second aspect, the present invention relates to a method for avoiding unwanted objects in a field of vision, the method comprising the steps of:

providing a field of vision defining a predetermined picture format/size,
providing a search field,
providing an alarm field, the field of vision being a proper subset of the alarm field, which is a proper subset of the search field,
attaching detectable means on the unwanted object,
providing detecting means for searching the detectable means within at least a part of the search field, and
providing signaling means for signaling when the detectable means enters said alarm field.

The search field comprises a plurality of pixels representing colors, and the detectable means may be colored in a specified color equal to a reference color. The method may then further comprise the steps of:
storing the reference color,
detecting groups of pixels in the search field having at least a predefined number of pixels representing the same color, and
comparing the groups of pixels having the same color with the said specified color.

Alternatively, the method may comprise the steps of:
storing the reference color,
detecting pixels having the specified color,
detecting adjacent pixels having the specified color and
comparing the number of adjacent pixels having the specified color with a predefined number of pixels.

Furthermore, the method may comprise, prior to the step of storing the reference color, the step of comparing the primary background colors in the search field with the reference color, so as to choose a reference color being different from the colors in the search field.

In some embodiments a reference pattern of colors is stored and used to detect the wind hood.

Preferably, the method comprises the step of selecting the group of pixels/adjacent pixels closest to the center of the field of vision, so as to select the origin of the object.

The reference color may be determined from an object by capturing an image of the object having the reference color. The reference color may be determined on the basis of the entire image of the object or a part of the image. E.g. the system may be provided with means for selecting an area in which the color is determined. This could be done by the user by means of a computer mouse.

The size of the alarm field may be adjusted by changing the length of its edges or by choosing between different pre-set picture formats. Thus, it is possible to set different alarm borders depending on how close the object may come to the field of vision.

According to a third aspect, the invention relates to a suspension for microphones and comprising:
a base member,
a plurality of bars mounted on said base member and extending in a direction transverse to a plane defined by the base member,
an internal microphone holder holding one or more microphones, and
a plurality of first elastic members extending between said bars and the internal holder for holding the internal holder in relation to said bars.

In some embodiments the base member may be pivotable mounted to a boom. The base member may be a plate or a ringshaped element e.g. a torus like element.

The internal holder is suspended in elastic members, such that any vibration from the boom does not give any resonance in the microphone. The internal holder may comprise at least one annular hollowed member surrounding a part of a handgrip of the one or more microphones, and supporting surfaces for the one or more microphones may be positioned in the interior area of said annular member. Preferably, the supporting surfaces comprise bricks of a resilient material, such as silicone, and the means for maintaining comprises second elastic members attached to said annular members and adapted to press a part of said handgrip towards the bricks.

In a preferred embodiment, the suspension comprises at least two hollowed annular members surrounding a part of a handgrip of the one or more microphones and being interconnected by at least an upper and lower rod to which said first elastic members are attached. The internal holder is preferably suspended in the bars, such that at least one point of suspension is placed between the center of gravity of the microphone(s) and the head of the microphone(s).

The bars may in the ends opposite to the base member be interconnected by a ring-shaped member, and the angle between the base member and the ring-shaped member is between 100° and 60°, such as between 20° and 40°, such as 30°.

A wind hood may surround at least the head of the microphone(s) and having layers of wind absorbing material stretched arranged with interspace on said bars.

According to a fourth aspect, the invention relates to a wind hood for a microphone and comprising at least an outer, a middle and an inner layer of wind absorbing material stretchable arranged with interspaces around the microphone. For each layer the wind passes, it is decelerated and laminated, such that when the wind has passed all three layers of wind absorbing material, the wind speed in reduced app. 80-95%.

Preferably, the layers in the wind hood is tubular and substantially ring-shaped and made of a material having a substantially homogenous wind absorbing surface, such that the wind absorbing effect from the wind hood is independent of the direction of the wind.

The material comprises an elastic fiber material, such as a textile of thin woven nylon fibers, and the interspace between each layer is 5-15 mm, such as 10 mm. The fibers may be woven such that the hole size in the woven pattern is between 0.1 mm$^2$ and 1 mm$^2$, such as between 0.3 mm$^2$ and 0.8 mm$^2$, such as between 0.5 mm$^2$ and 0.6 mm$^2$. The distance between each fiber may be between 0.1 mm and 1 mm, such as between 0.3 mm and 0.8 mm, such as between 0.5 mm and 0.6 mm.

The layers of the wind hood can be made of material from the nature, such as cotton, wool or flax, or it can be made of synthetic material, such as plastic or glass fibers.

In a preferred embodiment, the wind hood is surrounding microphone(s) is suspended in a suspension comprising:
a base member, and
a plurality of bars mounted on said base member and extending in a direction transverse to a plane defined by the base member, the microphone being suspended in between said bars, and
wherein the three layers are attached to first ring-shaped members in one end, respectively, and interconnected by a second ring-shaped member in the other end, the three layers being stretched by said first ring-shaped members attached to the end of first bars opposite to the base member and said second ring-shaped member attached to the base member.

At least the outer layer of wind absorbing material is preferably colored in a reference color, so that a system and a method according to the first and second aspects, respectively, can detect the wind hood and thus the microphone.

DETAILED DESCRIPTION OF THE INVENTION

Figure 2:
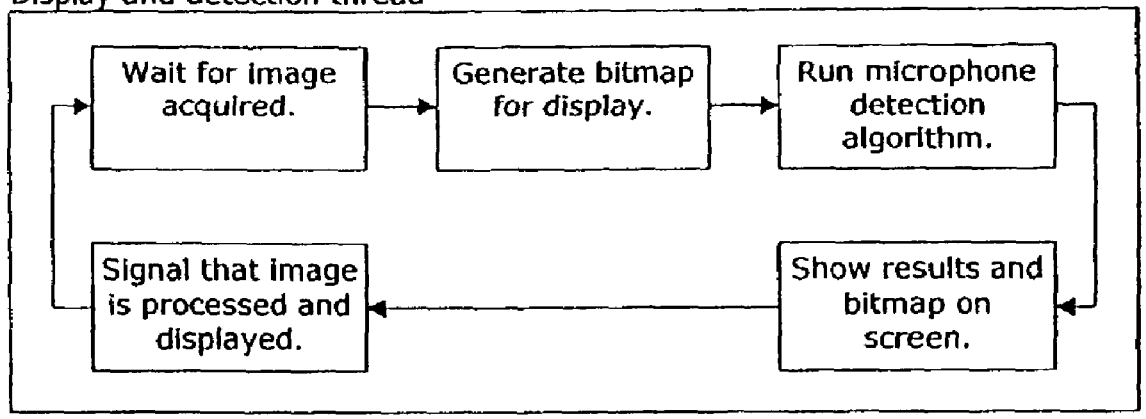
Figure 2:
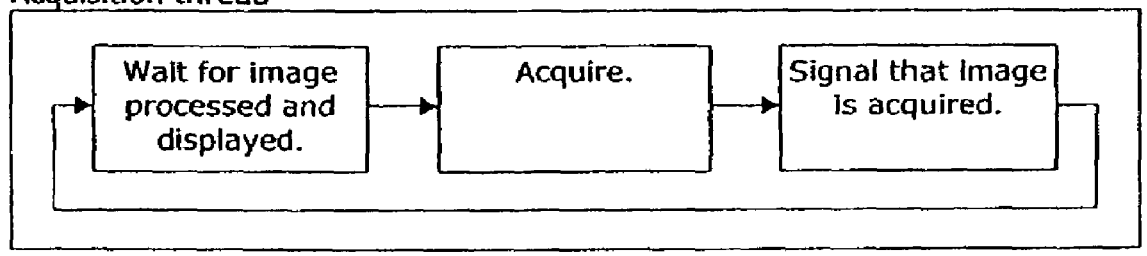
Figure 3:
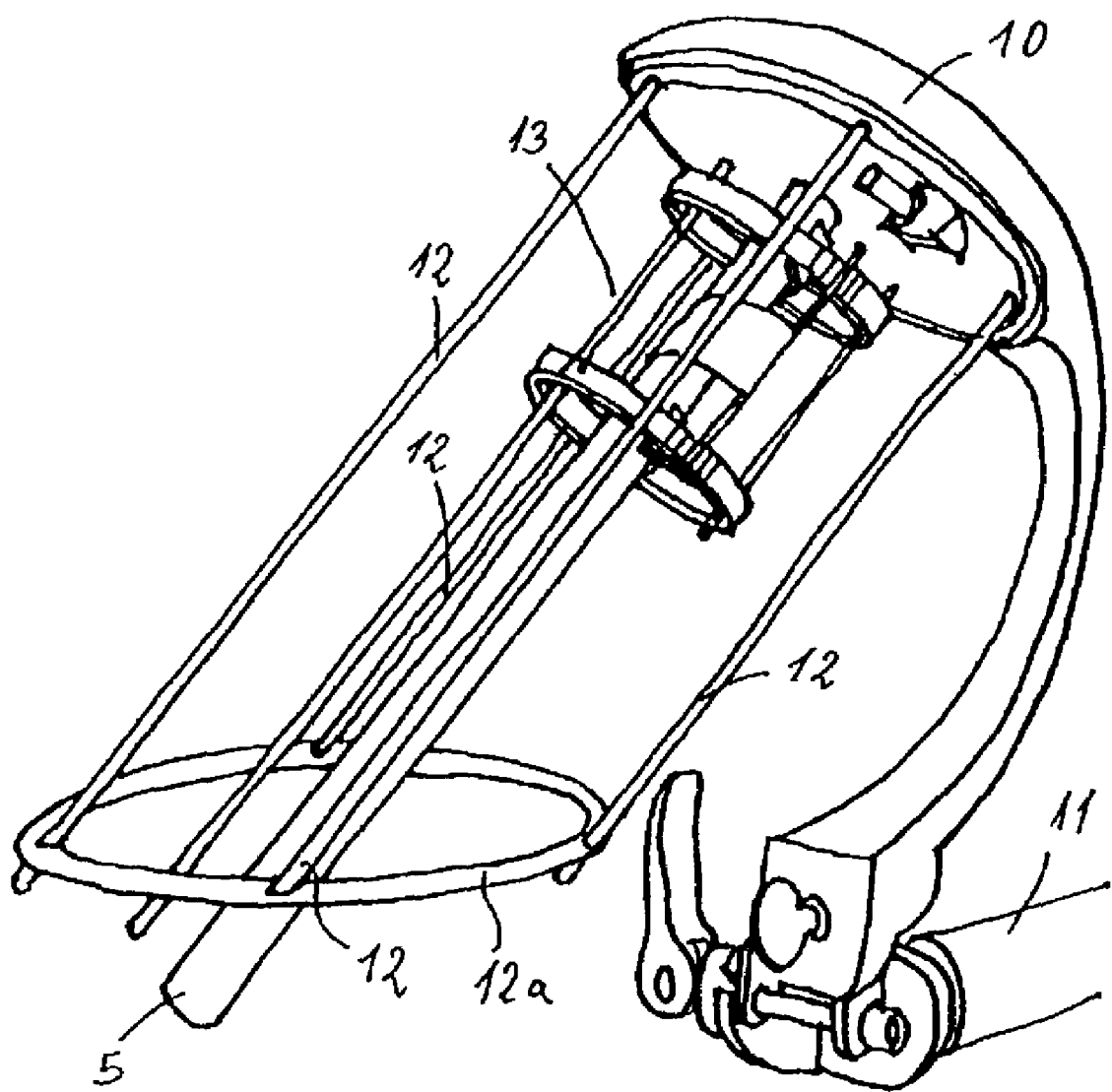
Figure 4:
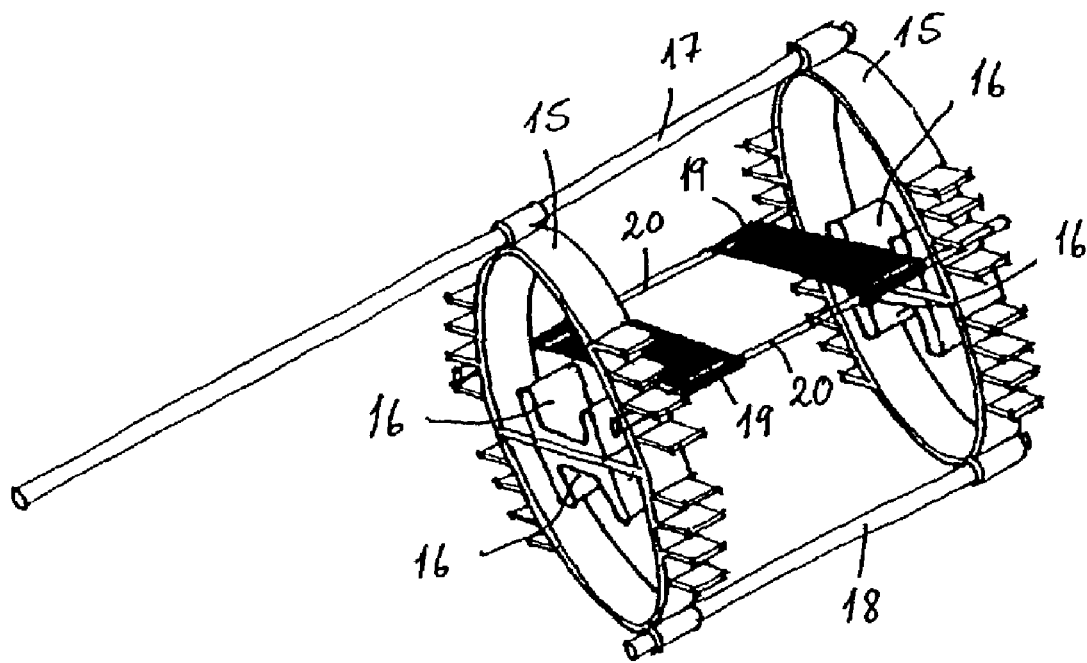
Figure 5:
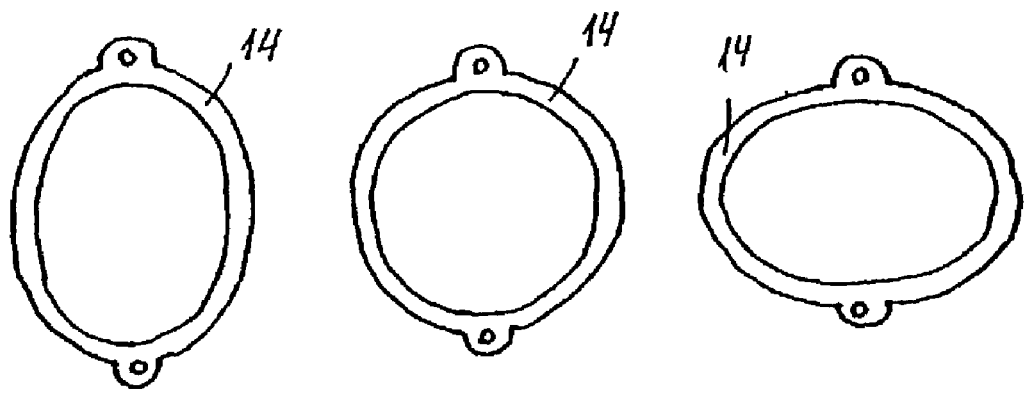
Figure 6:
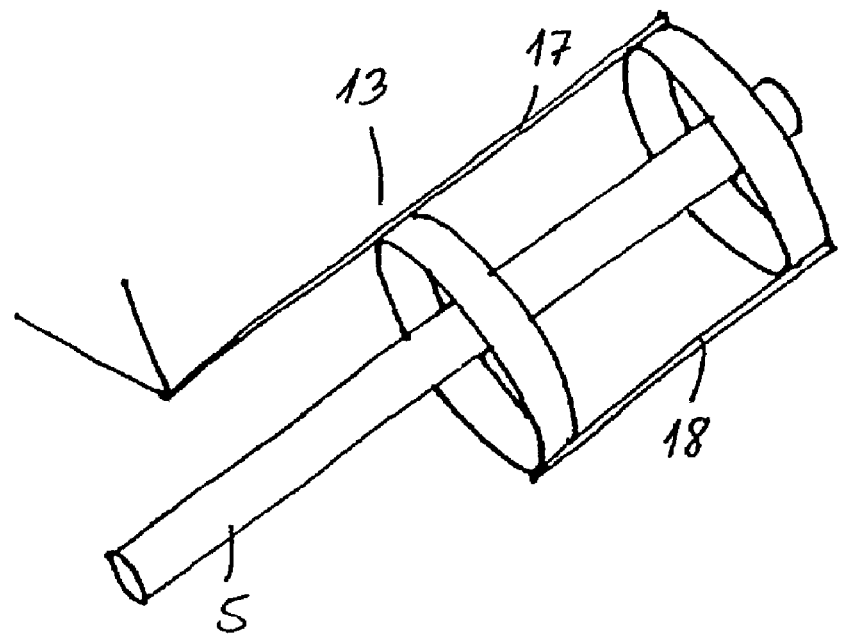
Figure 7:
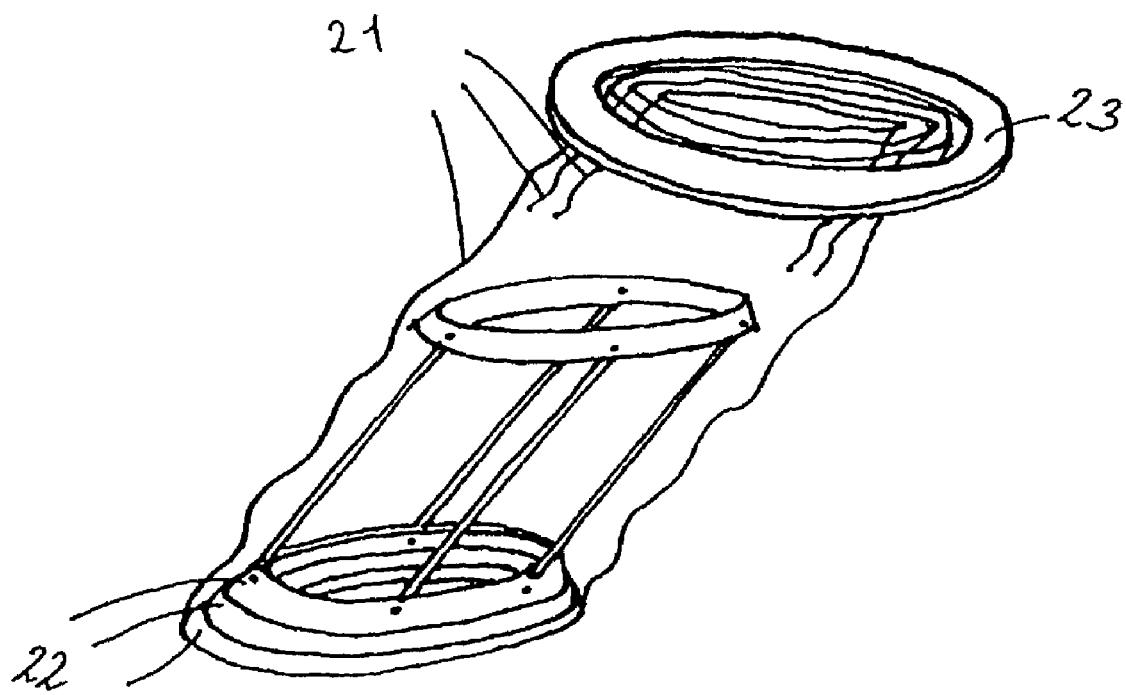
Figure 8:
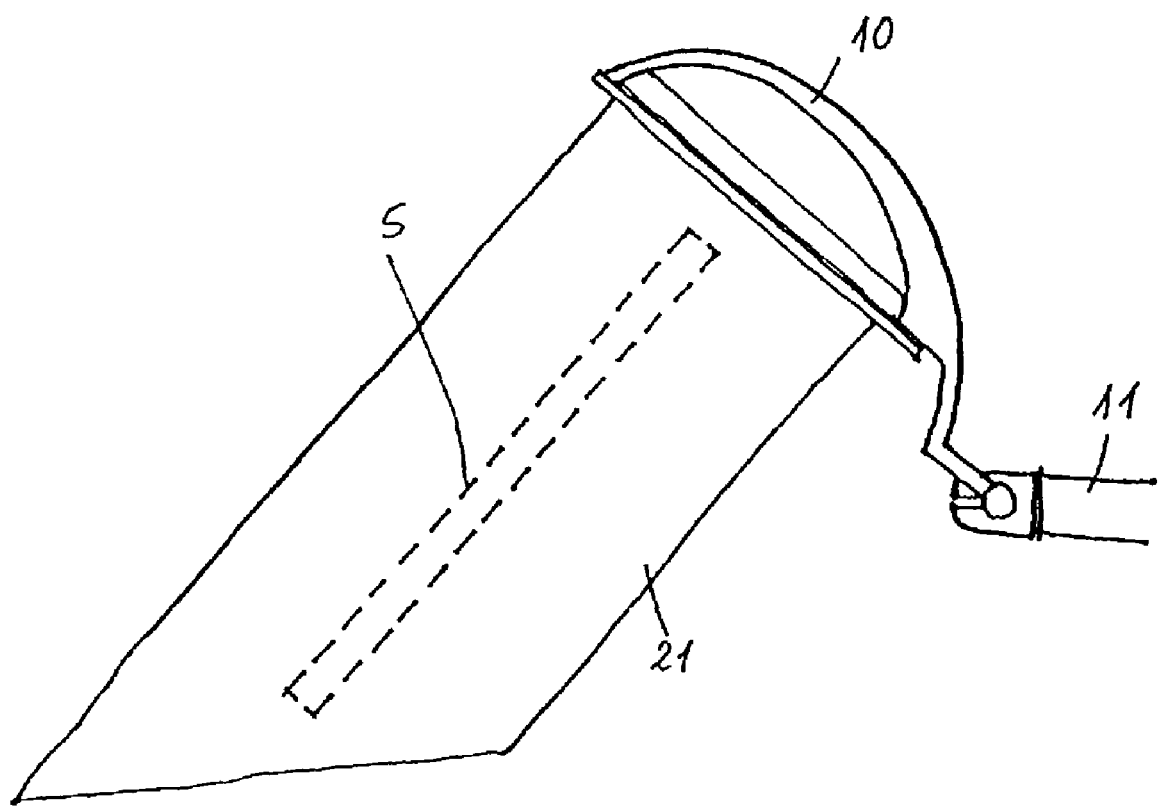
Figure 9:
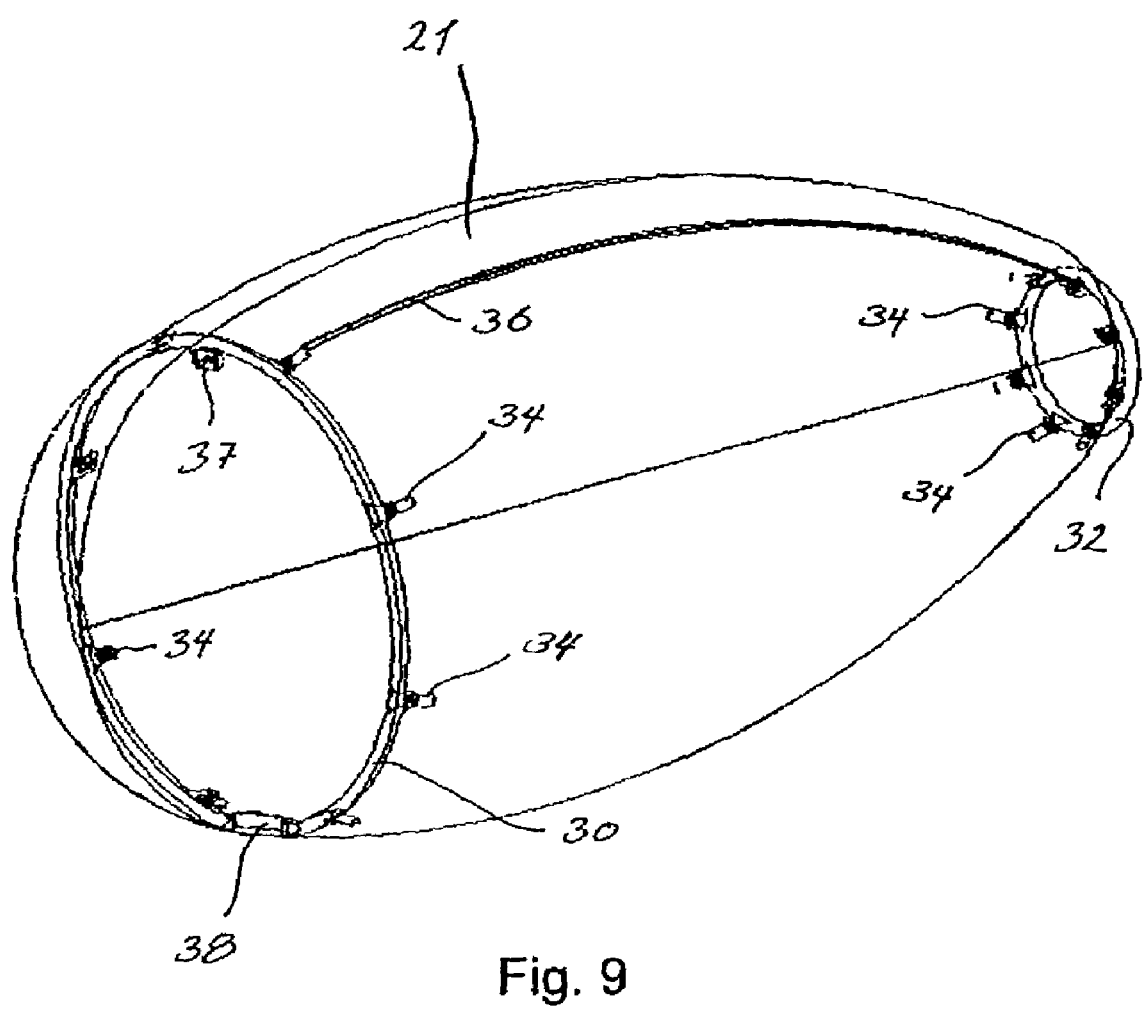
Figure 10:
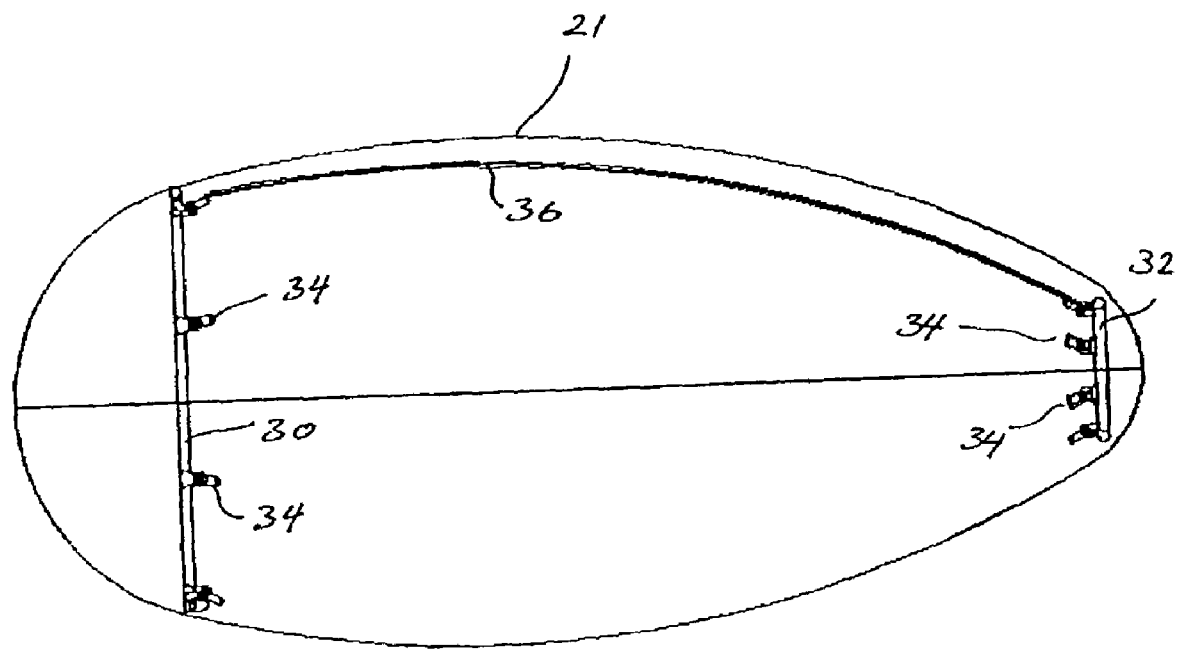
Figure 11:
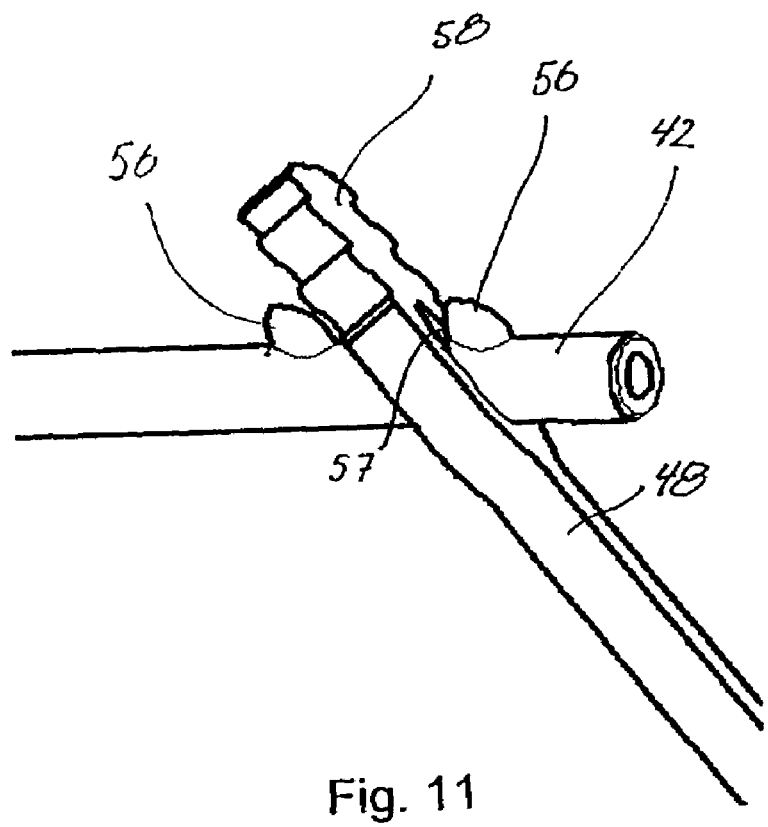
Figure 12:
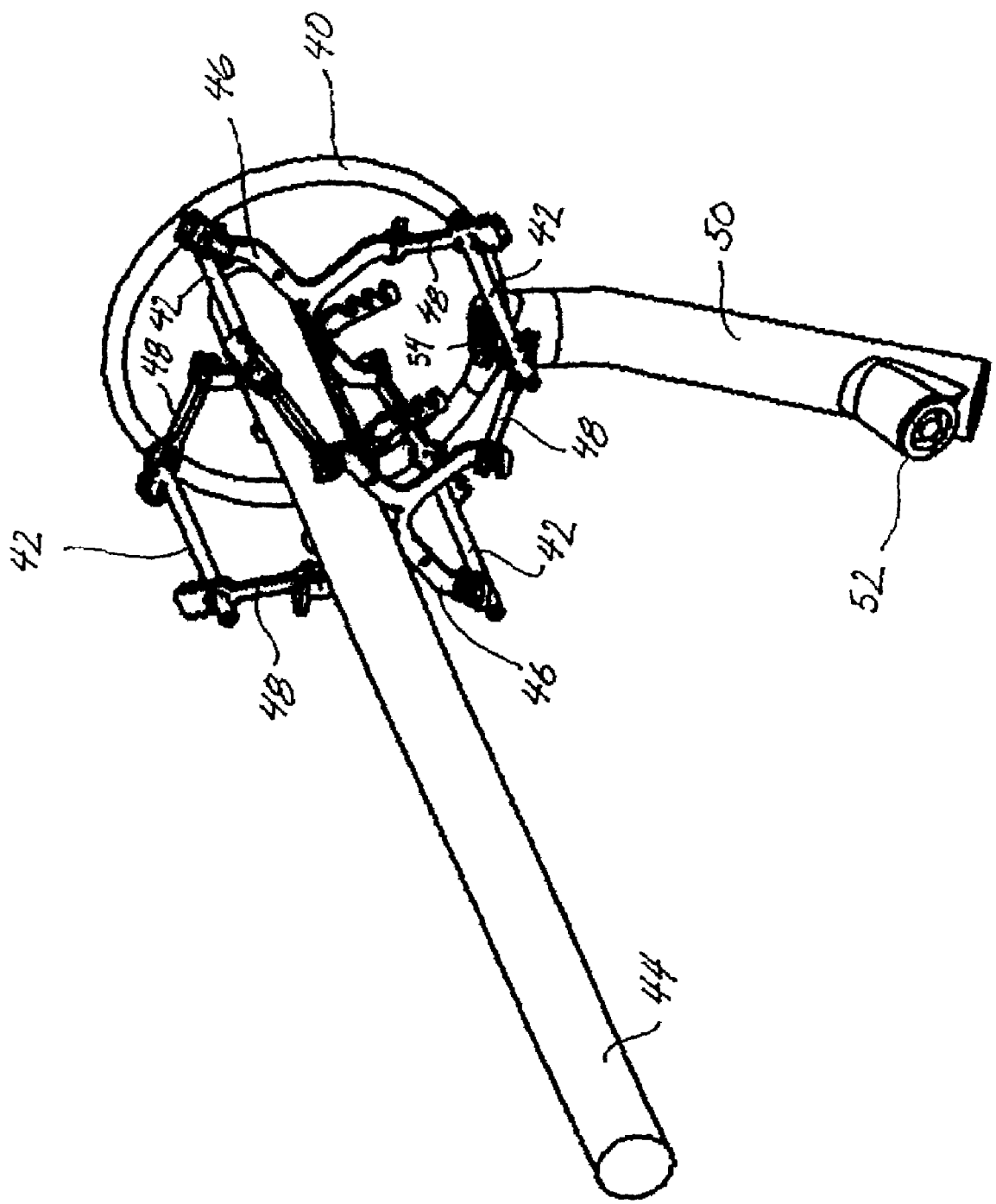

An embodiment of the invention will now be described in details with reference to the figures in which:

FIG. 1 shows a system for avoiding unwanted objects in a field of vision,

FIG. 2 shows a flow chart for a program according to the first aspect of the invention, FIGS. 3 and 4 show a wind hood and the suspension for a microphone, FIG. 5 shows elastic members for a suspension for a microphone, FIGS. 6-8 show a suspension for a microphone and a wind hood, FIGS. 9 and 10 show the wind hood, and FIGS. 11 and 12 show the suspension for the microphone.

FIG. 1 shows the system for avoiding unwanted objects in a field of vision. The system comprises a field of vision 1 defining a predetermined picture format/size, a search field 2, and an alarm field 3. The field of vision is a proper subset of the alarm field, which is a proper subset of the search field. The detectable wind hood 4 is attached to the unwanted object 4 (the microphone). The signaling means 6 signals to the boomer 7 when the detectable means enters said alarm field.

FIG. 2 shows a flow diagram of the process for detecting the object. The "microphone detection algorithm" may run through the following steps:
1. the microphone is searched in the alarm field,
2. each group of pixels with values corresponding to the colors the system has been taught to be the reference color/specified color is located,
3. for each found group the number of pixels is counted and the pixel closest to the center is selected to be the microphone origin,
4. all found microphone origins is then investigated and would only be assumed valid in case the number of pixels in the group exceeds a predefined number and if its origin has not move more than a given distance from an origin detected in a previous frame,
5. in case more than one group has been validated the group with the highest number of pixels is selected to be the microphone.

FIG. 3 shows a microphone suspension according to the invention. The suspension comprises a base member 10 pivotable mounted to a boom 11. A plurality of bars 12 extend substantially perpendicular to the base member and is adapted to hold the internal holder 13 by means of first elastic members 14 (see FIG. 5). An oval ring-shaped member 12a interconnects the bars in the ends opposite to the base member. The microphone 5 is suspended in the internal holder 13.

FIG. 4 shows the internal holder 13 of the microphone suspension. The holder comprises two hollowed annular members 15 surrounding the handgrip of the microphone. The annular members comprise supporting surfaces 16 for one or more microphones. An upper rod 17 and a lower rod 18 connect to the two annular members. The microphone(s) is maintained to the holder by means of the elastic members 19 that are attached to the annular members by means of the bars 20.

FIG. 5 shows the first elastic members 14 that hold the internal holder 13 in relation to the bars 12 of FIG. 3. The elastic members 14 absorb the vibrations that may come from the boom, such that the vibrations do not influence on the sound quality in the microphone. The internal holder is preferably suspended with a plurality of elastic members extending in 10-15 directions.

FIG. 6 shows the internal holder 13 with a microphone suspended therein. The upper rod 17 extends over the center of gravity of the microphone, and wherein the holder is suspended in the bars 12 of FIG. 3, such that the point of suspension is placed between the center of gravity of the microphone(s) and the head of the microphone(s).

FIG. 7 shows an embodiment of the wind hood according to the invention. The wind hood comprises three layers of wind absorbing material (nylon) 21 arranged on three oval-shaped members 22 in one end and a ring-shaped member 23 in the other end. the wind hood is stretched out when the ring-shaped members are being attached to the suspension as shown in FIG. 8. The wind hood is foldable so that it takes up as less room as possible when not being used.

FIG. 8 shows the microphone suspension with the wind hood mounted thereon. The wind hood is stretched out, as the three oval-shaped members 22 of FIG. 7 are attached to the oval ring-shaped member 12a of FIG. 3 and the ring-shaped member 23 is attached to the base member 10 of FIG. 3.

FIGS. 9 and 10 show a wind hood comprising a wind absorbing material 21. In the figure there is only shown one wind absorbing material but a plurality of layers may be provided such as two or three or four or more. The wind hood comprises a back ring 30 and a front ring 32. On both rings are provided a plurality of hinges 34 to which interconnecting members 36 are provided. The members 36 may be springs of strip steel. As the members 36 are connected to the rings 30 and 32 the wind hood may be twisted into a position where the wind hood is folded. This may be done by turning the rings in opposite directions e.g. clockwise and counter clockwise whereby the rings may be turned into a position where they touch or nearly touch each other. Furthermore springs may be provided in the ends of the wind hood so as to stretch out the wind hood. In some embodiments (not shown) a sponge like element may be provided in one end e.g. such that it is inserted into the front ring 32. The element may be provided with a color to be detected by the invention according to the first and second aspect of the invention. The element may be provided with a wind absorbing material.

The back ring 30 may be provided with attachment means 38 adapted to attach the primary grip of FIG. 12 to the wind hood. If only the back ring 30 is attached to the primary grip it is important that it is sufficiently stiff to support the rest of the wind hood and stiff enough to ensure that the inner surfaces of the wind hood do not touch the microphone. The back ring 30 is furthermore provided with a hinge 37 such that the end part of the wind hood may be opened when the primary grip is attached to the wind hood. By hinging the end part of the wind hood to the rest of the wind hood it is ensured the end part is not misplaced and thereby lost.

FIGS. 11 and 12 shows a suspension for a microphone comprising a base ring 40 comprising a plurality of bars 42. A microphone 44 is supported by microphone supports 46 which are attached to the bars 42 by means of springs 48. A primary grip 50 is attached to the base ring 40. The primary grip 50 is provided with two signal connectors 52 and 54 which are electrically connected to each other. The connector 54 may be connected to the microphone and the connector 52 may be connected to sound recording equipment, thus the electrical connection to the microphone may be secured and thereby any rattling or noise for the connection is eliminated. The primary grip may extend in a direction such that it is situated under the center of gravity of the microphone. All the elements of the suspension device and the wind hood may be as smooth and round as possible such that acoustic influence from wind e.g. wind noise is reduced or eliminated.

The bars 42 are provided with locking means 56 adapted to engage with a part of the springs 48. A plurality of locking means 56 are provided such that the tension of the springs 48 may be adjusted. Thus the tension may be adjusted depending on the size and the weight of the microphone. The springs may be provided with more than one hole 57 (adapted to engage the locking means) and thus the tension of the spring may be adjusted even further. The spring comprises gripping means 58 such that it is easy for the user to adjust the tension of the spring. The springs are changeable and may have a hardness of 50 shore. In some embodiments the hardness may be between 40-60 shore or 30-70 shore or 20-80 shore or 10-90 shore. Other parts of the suspension device may be made of light materials such as carbon-fiber materials or aluminum or plastic.

The wind hood may be constructed such that it encapsulates the microphone completely and thus wind turbulence inside the wind hood and around the micro phone may be avoided. The suspension may be designed so as to be as open as possible and thus reducing acoustic interference.

It should be understood that, though the present invention relates to a number of independent aspects, any combination of these aspects is possible within the scope of the present invention.

The invention claimed is:

1. A suspension for microphones, comprising:
   a base member,
   a plurality of bars mounted on said base member and extending in a direction transverse to a plane defined by the base member,
   an internal microphone holder holding at least one microphone,
   a plurality of first elastic members extending between said bars and the internal holder for holding the internal holder in relation to said bars, and
   at least two hollowed annular members surrounding a part of a handgrip of the at least one microphone and being interconnected by at least an upper and lower rod to which said first elastic members are attached.

2. The suspension according to claim 1, wherein the base member is pivotably mounted to a boom.

3. The suspension according to claim 1, wherein the internal holder comprises:
   supporting surfaces for the at least one microphone being positioned in the interior area of said annular members, and
   means for maintaining the at least one microphone to said supporting surfaces.

4. The suspension according to claim 3, wherein the supporting surfaces comprise bricks of a resilient material, such as silicone, and wherein the means for maintaining comprises second elastic members attached to said annular members and adapted to press a part of said handgrip towards the bricks.

5. The suspension according to claim 2, wherein the internal holder is suspended in the bars, such that at least one point of suspension is placed between the center of gravity of the at least one microphone and the head of the at least one microphone.

6. The suspension according to claim 2, further comprising a wind hood surrounding at least the head of the at least one microphone and having layers of wind absorbing material stretched arranged with interspace on said bars.

7. The suspension according to claim 2, wherein the bars in the ends opposite to the base member are interconnected by an oval ring-shaped member.

8. The suspension according to claim 7, wherein the angle between the base member and the oval ring-shaped member is between 10° and 60°.

9. The suspension according to claim 1, further comprising a wind hood having at least one layer of wind absorbing material stretchable arranged around at least the head of the at least one microphone.

10. The suspension according to claim 8, wherein said angle is between 20° and 40°.

11. The suspension according to claim 8, wherein said angle is 30°.

* * * * *